United States Patent
Recouly

(10) Patent No.: US 6,434,401 B1
(45) Date of Patent: Aug. 13, 2002

(54) METHOD FOR THE SETTING OF A MULTIBAND MOBILE TELEPHONY TRANSMITTER-RECEIVER AND MOBILE TELEPHONE THUS OBTAINED

(75) Inventor: Marc Recouly, Lierville (FR)

(73) Assignee: Sagem SA, Paris (FR)

( * ) Notice: Subject to any disclaimer, the term of this patent is extended or adjusted under 35 U.S.C. 154(b) by 0 days.

(21) Appl. No.: 09/432,583

(22) Filed: Nov. 12, 1999

(30) Foreign Application Priority Data

Nov. 13, 1998 (FR) ............................................ 98 14294

(51) Int. Cl.[7] ................................................ H04B 1/38
(52) U.S. Cl. .......................... 455/555; 455/76; 455/85; 455/86; 455/553
(58) Field of Search ............................ 455/73, 76, 78, 455/84, 85, 86, 209, 315, 552, 553

(56) References Cited

U.S. PATENT DOCUMENTS 5,535,432 A * 7/1996 Dent ........................... 455/84
5,649,308 A    7/1997 Andrews ..................... 370/334
5,890,051 A * 3/1999 Schlang et al. ............... 455/76

FOREIGN PATENT DOCUMENTS

| EP | 0 581 573 | 2/1994 |
|---|---|---|
| EP | 0 678 974 | 10/1995 |
| EP | 0800283 | 10/1997 |
| GB | 2310342 | 8/1997 |
| WO | WO 98/34341 | 8/1998 |

* cited by examiner

Primary Examiner—Lee Nguyen
(74) Attorney, Agent, or Firm—Nilles & Nilles SC

(57) ABSTRACT

To make a multiband transmitter-receiver without having to greatly increase the number of oscillators used for the modulation and demodulation of signals located in frequency bands that are very different from one another, a pair (13, 14) of programmable frequency dividers is used, installed in a transmission circuit comprising a transmission frequency oscillator (3, 30), a single transition frequency oscillator and an intermediate frequency oscillator. To go from a use (11) in one band to a use in another hand, it is enough, by means of a microprocessor (15), to modify the division coefficients of the programmable dividers by using infradyne and supradyne dividers.

16 Claims, 2 Drawing Sheets

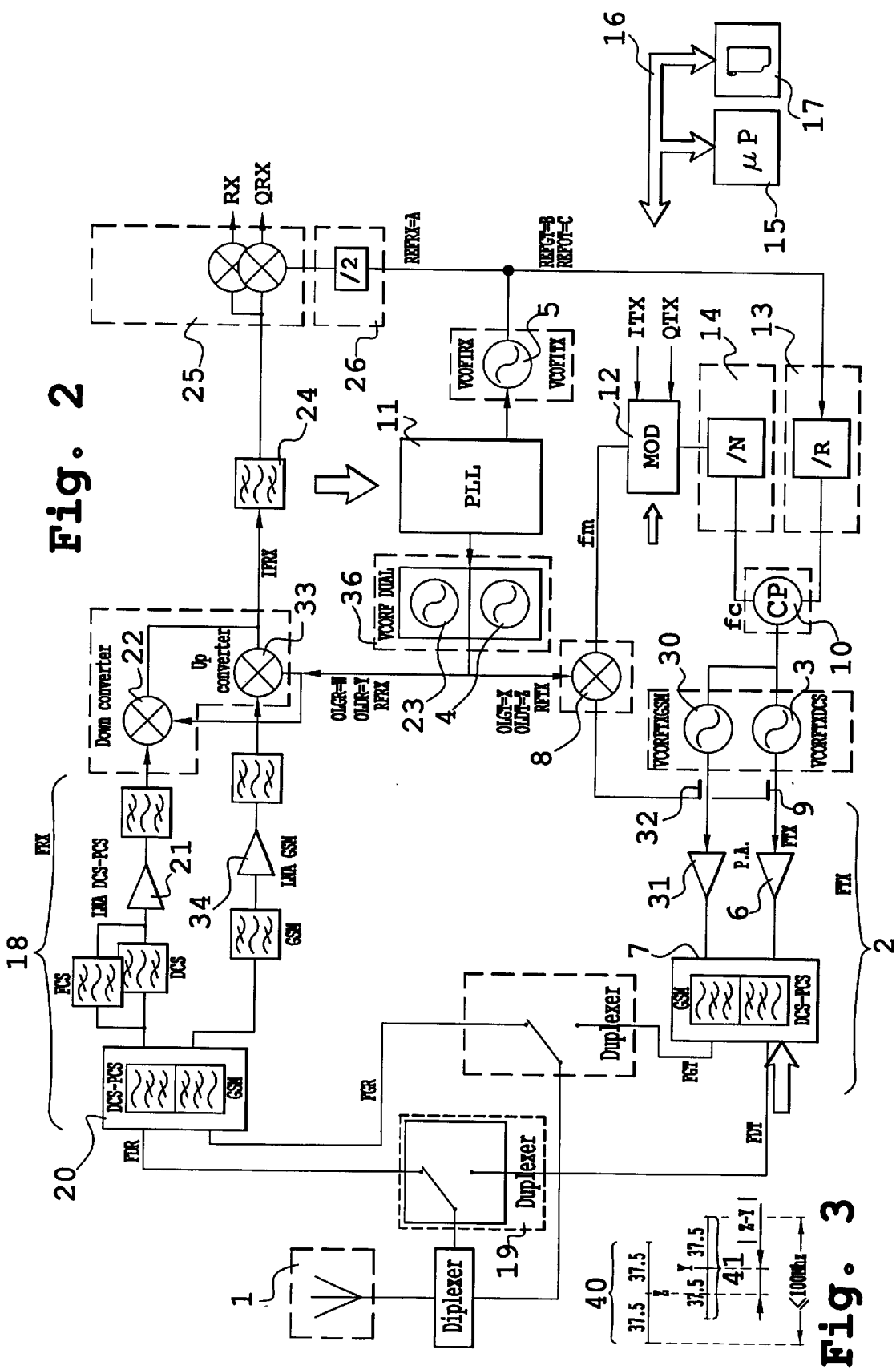

METHOD FOR THE SETTING OF A MULTIBAND MOBILE TELEPHONY TRANSMITTER-RECEIVER AND MOBILE TELEPHONE THUS OBTAINED

BACKGROUND OF THE INVENTION

Field of the Invention

The object of the present invention is a method for setting the operating frequencies of a multiband mobile telephony telephone and a telephone thus obtained. It can be used chiefly in the field of mobile telephony when it is necessary to go from a given frequency band to another given frequency band, in most cases according to another standard for the encoding of transmitted messages. The aim of the invention is to reduce the cost of manufacture of a multiband telephone of this kind.

In the field of radiocommunications, there is a known standard called the GSM standard in which the messages are broadcast by base stations and/or mobile telephones in the 900 MHz range. Furthermore, there is the known DCS standard in which the frequency range is about 1800 MHz. There also exists the PCS range in which this frequency band is 1900 MHz. There is also the UMTS standard in which the frequency band is 2200 MHz. The existence of all these bands or other future ones of course favours the multiplicity of communication networks and, hence, a greater possibility, in terms of frequencies, of users being connected with one another.

In addition to different frequency bands, there are transmission channel division modes of the time, frequency or coding type such that it is possible to convey various, simultaneous communications from one and the same base station and in one and the same geographical domain. The transmissions thus are of the TDMA, FDMA or CDMA type or, again, of the combined type. These terms signify Time Division Multiple Access, Frequency Division Multiple Access and Coded Division Multiple Access, translated in French as Accès Multiple à Répartition dans le Temps, Accès Multiple à Répartition en Frequence, or Accès Multiple à Répartition de Codage, AMRT, AMRF, and AMRC. The invention can be applied whatever the mode of transmission from this viewpoint.

The instruments referred to are obviously transmitters-receivers and must comprise a transmission and a reception chain. The base stations often comprise, in fixed positions, the same blocks and components as mobile telephones since the latter are mass produced and therefore inexpensive. For this reason, the invention relates to mobile telephony telephones whether these telephones are themselves mobile or not.

In such telephones, on the basis of a common antenna, a device is used to separate a reception channel from a transmission channel. In the transmission channel, given a frequency agility that is generally implemented in methods of mobile telephony, it is the common practice to make a transmitter with three oscillators. A first oscillator, which is an output oscillator, produces a signal at a transmission frequency. This transmission signal is furthermore mixed in a mixer with a signal produced by an oscillator producing a signal at a transition frequency. The mixer produces a difference signal having a frequency that corresponds to the difference between the transmission frequency and the transition frequency. This difference signal is then compared with a signal produced by a third oscillator at intermediate frequency. To put it in precise terms, the intermediate frequency produced by the third oscillator may be in the range of 200 MHz and the difference between the transmission frequency and the transition frequency is in the same range. It is then enough to work on the transition frequency to prompt changes, from one frame to another or periodically, in the transmission frequency and to maintain the required agility.

The problems of this type of operation are numerous. One of them is related to the great difference in frequency that exists between the different standards. Indeed, from the GSM standard to the DCS standard, the frequency is quite simply doubled. In addition, the frequency excursions used to achieve frequency agility, which are themselves standardized, are quite considerable. Thus, for the GSM standard, the dynamic range of frequency (in transmission or in reception) is 35 MHz. For the DCS and PCS standards it is 75 MHz and 60 MHz respectively.

For a single-band apparatus furthermore, one and the same transition frequency oscillator is used in the reception channel. In this case, the signal that it produces is mixed in a reception mixer with the received signal. The reception mixer then produces a signal whose frequency is substantially equal to the frequency of the intermediate frequency oscillator so as to enable immediate demodulation in base band. Thus, the number of mixers and the number of demodulations are limited.

By way of an indication, a separation between the frequency band allocated to transmission and the frequency band allocated to reception is equal to 10 MHz in the GSM standard, 20 MHz in the DCS standard and in the PCS standard. This ultimately means that the transition frequency oscillators must be capable of a dynamic range respectively of 80 MHz (35 plus 10 plus 35), 170 MHz (75 plus 20 plus 75) and 140 MHz (60 plus 20 plus 60) for these three standards respectively. Given these very significant excursions (which are in the range of 10% of the nominal frequency of the oscillator), it does not appear to be possible, in the present state of the technology of manufacture of these oscillators, to make them cover two bands, even the two closest ones (DCS and PCS). To make them cover a single band is already a problem.

Indeed, for high quality service with a mobile telephone, the spectral purity of these oscillators has to be higher than −87 dBc/Hz to 10 KHz of the carrier, higher than −107 dBc/Hz to 100 KHz of the carrier and higher than −140 dBc/Hz to 3 MHz of the carrier. The frequency setting range of the oscillator at the transition frequency is theoretically between 1 and 2 GHz. In fact, the complexity of these oscillators, for GSM, DCS and PCS applications, leads to their being placed in three categories.

A first category lists the voltage-controlled oscillators known as non-adjusted oscillators. For these oscillators, only the controlled voltage makes it possible to compensate for the dispersion of characteristics of their components, and to work on a certain frequency band around an imposed base frequency. In the mobile telephones today, the supply voltage is about 3 volts. Indeed, they use three battery elements, giving 3.6 volts in rated voltage. A regulator reduces this voltage to three available volts. The useful controlled voltage is then between 0.5 and 2.5 volts. Given the compensation for the dispersion of the characteristics by the voltage, this voltage range cannot be exploited to the full extent and, in practice, the frequency band around an imposed base frequency can only be about 40 MHz. These first category oscillators are also the least expensive ones.

A second category lists the oscillators known as adjusted oscillators. For these oscillators, the dispersion of the characteristics due to their components is compensated for by preliminary settings. The controlled voltage is used however used to compensate for the temperature dispersions. In this case, for one and the same range of control voltage of 2 volts, it is possible to have a working range of 100 MHz around an imposed base frequency.

In a third category, the useful band is further increased around a base frequency imposed in two ways. Either a resonator of the oscillator is switched over or the range of control voltage is increased. The switching over of an element in the oscillator makes it possible to have a second band. Since this switched element is not adjusted, it is difficult to achieve high precision. Furthermore, if an element of this kind is very important, it adds a temperature drift in the oscillation frequency. For this reason, the frequency leap is limited. The two bands must remain within a limited band. For one and the same range of control voltage of 2 volts, there is thus obtained a range of operation of 220 MHz. Comparable results are obtained by using a voltage multiplier. The oscillator does not become more complex, but the control circuit for its part is complex. The oscillators of this third category are obviously far costlier than those of the second category which themselves are costlier than those of the first category.

There is a fourth category comprising two oscillators in one and the same pack. It is comparable, in terms of cost, to two oscillators of the second category.

Given these constraints of limited dynamic range of frequency, the growing complexity of these oscillators has a direct impact on their cost. It is thus possible schematically to assign them costs with a value 1, 2 and 3 depending on their category. Another criterion for appreciating the cost of a transmitter-receiver stage would be to add up all the frequency bands of all the oscillators involved.

A multiband mobile telephony telephone ought to have as many sets of transmission/reception systems as are desired in order that it be capable of covering the different bands. The cost of a mobile telephony telephone of this kind would then be directly proportional to the number of bands served. In general, its cost would be multiplied by four, especially because the oscillators would be multiplied. This is not acceptable.

OBJECTS AND SUMMARY OF THE INVENTION

According to the invention, this problem will be resolved on the basis of a limited number of oscillators. In a complete version, and in one mode of use, there will be only be five or even four oscillators available: namely even less than what would be necessary to permit operations in two distinct bands. The first object of the invention therefore is to diminish the number of voltage-controlled oscillators used and reduce their cost.

Another object of the invention, when oscillators are used with one and the same low setting range, is not to have to switch the oscillator over to the frequency of transition between transmission and reception, whereas the setting ranges of these oscillators are small as compared with the desired dynamic range of frequency variation for any given standard. Indeed, it is sought to be able to exploit all the possibilities of the standards which, when it is sought to transmit large quantities of information, stipulate transmission in successive temporal windows. In this case, the change from transmission to reception must be done during very short periods of time. Oscillator switch-over is ruled out in this case: the switch-over time of an oscillator with a wide dynamic range is far too long.

Thus, in the invention, it is seen to it that the dynamic range of control of the transition frequency oscillators may be low and that they do not have to be switched over. In this way, the oscillators are less expensive while at the same time meeting requirements.

One of the means of the invention consists in making frequency dividers available at output of the oscillators, especially at output of the intermediate frequency oscillator and also between the first mixer and a comparator. Then, action is taken on the division coefficients of these dividers so as to produce frequency combinations by algebraic composition (addition or subtraction) enabling the exploration of all the allocated bandwidths, in transmission and in reception, in furthermore limiting the dynamic setting range of a variable oscillator, essentially the transition frequency oscillator.

The solution of the invention is then noteworthy in that the oscillators used are not switched over when passing from transmission to reception and vice versa. Since there is no such switch-over, the build-up time to lead to a given use of an oscillator, due to a frequency agility, leads to the ability to use successive temporal windows in one and the same TDMA frame, which is favorable to increasing the information bit rates to be transmitted with a mobile telephony telephone.

Indeed, a radiofrequency synthesizer, the transition frequency oscillator, because of the principle of the heterodyne reception (selectivity filtering on a single intermediate frequency) must follow frequency steps of the input signal, namely channels staged in steps of every 200 KHz. This is not the case with the intermediate frequency oscillator which, especially in GSM, DCS and PCS, may be synthesized from a recommended clock frequency. The recommended frequency is 13 MHz and leads to a 1 MHz step obtained by division by 13.

Owing to its 1 MHz step and therefore its comparison frequency of 1 MHz, the intermediate frequency oscillator is faster (in a ratio that is the square root of the ratios of the comparison frequencies: in this case $\sqrt{5}$) than the transition frequency oscillator, this being the case for the same loop and for equivalent spectral purity values.

This speed enables the oscillators to be cut off for a longer time between each temporal window, which results in lower consumption. It also enables the use of several windows in one and the same frame for data transmission in accordance with the requirements of the GSM standard 05 02.

In the invention, the range of operation of the transition frequency oscillator is determined by choosing the criteria of the presence of the dividers, the abandonment of the switching over of the transition frequency oscillator and an infradyne/supradyne composition both in transmission-reception and in different GSM, DCS and PCS bands. This leads to low-cost solutions since the single transition frequency oscillator is in the third category while the intermediate frequency oscillator is in the first category. Or else, these two oscillators are, at most, in the second category. The result of this is a significant reduction of the price of transmitters-receivers and therefore of the multiband telephone.

An object of the invention therefore is a method for the setting of a multiband telephony receiver comprising a radiation antenna, a transmission channel and a reception channel connected to this aerial, a first, second and third voltage-controlled oscillator respectively delivering a signal at a transmission frequency, a signal at a transition frequency and a signal at an intermediate frequency, the signal at the transmission frequency being transmitted by the first oscillator to the antenna, a first mixer connected at input to the outputs of the first and second oscillators and receiving, from this first oscillator, the signal at the transmission frequency and, from this second oscillator, the signal at the transition frequency, a comparator connected at input to the output of the first mixer and to the output of the third oscillator, and delivering at output a control signal for the first oscillator, and between the first mixer and the comparator and, between the third oscillator and the comparator respectively, a first and a second frequency divider, characterized in that it comprises the following steps:
- a system of inequalities is set up taking account of a frequency-limited dynamic range of a single transition frequency oscillator so that this oscillator covers all the desired bands in transmission and reception, this system of inequalities possessing unknown quantities that are frequency ranges of this transition frequency oscillator and this intermediate frequency oscillator,
- the system of inequalities is resolved by choosing values of division of the frequency dividers below a predetermined number,
- the transmitter-receiver is set with solutions of the inequalities by programming the dividers,
- and the first mixer is made to work in infradyne mode for one frequency band and in supradyne mode for another.

BRIEF DESCRIPTION OF THE DRAWINGS

The invention will be understood more clearly from the following description and the appended figures. These figures are given purely by way of an indication and in no way restrict the scope of the invention. Of these figures:

FIGS. 1 and 2 show schematic views of transmission and reception circuits of a mobile telephony telephone according to the invention, which is respectively a three-band telephone and a two-band telephone;

FIG. 3 is a view of frequency occupancy of the different frequency bands to be combined in order to cover them with one and the same oscillator.

DESCRIPTION OF THE PREFERRED EMBODIMENTS

Figure 1:
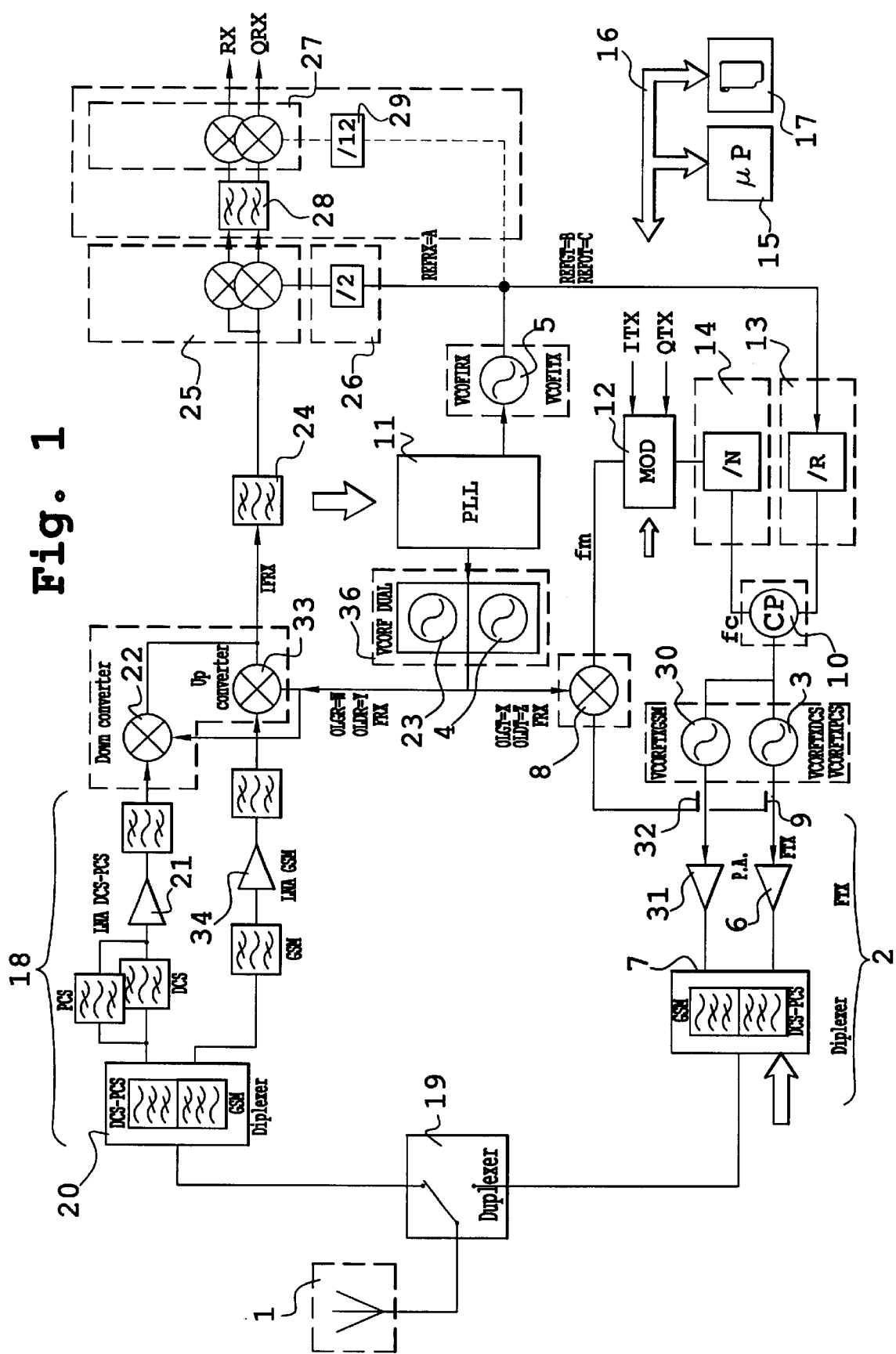

The description also comprises a TABLE 1 and TABLE 2 which are tabulated representations of different possibilities of setting the oscillators of the invention. TABLE 1 and TABLE 2 are incorporated into the present description of which it forms a part. TABLE 1 and TABLE 2 are an integral part of the description and, by virtue of this fact, do not need to be described more particularly.

FIGS. 1 and 2 show a transmitter-receiver that can be used in a mobile telephony telephone according to the invention. This transmitter-receiver is respectively a three-band and two-band transmitter-receiver in these figures. This telephone may be placed as a transmitter-receiver device into a base station or a mobile telephone since ultimately it comprises all the elements needed for transmission and reception. The result of this is that it considerably lowers the cost of the base stations too. This mobile telephony telephone essentially comprises an antenna 1 and a transmission channel 2. It also comprises a first, second and third voltage-controlled oscillator, respectively 3, 4 and 5. These oscillators 3, 4 and 5 bear the names VCO (for voltage-controlled oscillator), TX, RF or FI pertaining to the nature of the frequency of the signals that they produce: transmission frequency, transition frequency (RF) or intermediate frequency. They also comprise a name DCS (or GSM or the like) depending on the standard for which, in one example, they are intended. The oscillator 4 also has an indication TX for transmission (and RX for reception) depending on the use made of it in the invention. This oscillator 4 is preferably unique and used for both functions.

In transmission, the oscillator 3 produces the signal at the transmission frequency which is transmitted by the channel 2 to the antenna 1. To this end, the channel 2 has a power amplifier 6 and a diplexer circuit 7. A diplexer circuit 7 of this kind (by analogy with duplexers) is responsible for the separation, by filtering, of the transmission channels depending on whether the signal is in one band (GSM, DCS, PCS band) or another.

This telephone also has a first two-input mixer 8. At first input, the mixer 8 receives a signal coming from the oscillator 3 and picked up by a sensor 9. At a second input, it receives the output signal of the oscillator 4 at the transmission frequency. FTX designates the frequency of the signal produced by the oscillator 3 intended for the mixer 8 and RFTX is the frequency of the signal produced by the oscillator 4. The mixer delivers a signal with a frequency fm.

The signal delivered by the third oscillator, as well as the signal at the frequency fm delivered by the first modulator 8, are conducted to both inputs of a comparator 10. The comparator 10 delivers a control signal that controls the working of the oscillator 3. With respect to the oscillators 4 and 5, they are furthermore controlled by a regulation and programming circuit 11 whose operation shall be seen further below. Furthermore, a modulator 12 has been shown in cascade-connection between the mixer 8 and the comparator 10, receiving transmission signals I and Q (ITX and QTX). The fact of placing the modulator 12 at this place is not a necessity. The modulator 12 could be put in any other place.

The telephone of the invention furthermore comprises other elements (especially those used in the production of the signals ITX and QTX) not described because they are common to the invention and to prior art telephones.

An essential characteristic of the invention lies in the fact that the oscillator 5 is connected to the comparator 6 by means of a divider by R referenced 13, while the mixer 8 is connected to the comparator 10, herein cascade-connected with the modulator 12, by a divider by N referenced 14. The dividers 13 and 14 enable the division of the frequency of the two signals VCOFITX and fm delivered respectively by the oscillator 5 and the mixer 8. The comparator 10 must then compare signals whose frequency is lower. The frequency of the signals thus introduced at the two inputs of the comparator 10 is quite smaller than that of the signals VCOFITX and fm. Furthermore, the modulator 12 could be placed in the link between the oscillator 5 and the comparator 10 if N=R.

TABLE 1 will serve to show those combinations, among all the possible combinations of N and R, which, according to the invention, may lead firstly to a reduction of the number of oscillators and secondly to a limitation of the dynamic range of frequency of these voltage-controlled oscillators. To this end, the telephone of the invention furthermore comprises a microprocessor 15 connected by a bus 16 to a program and working memory 17. The bus 16 furthermore produces control signals enabling the modification of the values R and N at request, the controlling of the setting circuit 11, the switching of the diplexer 7 as well as the controlling, in general, of all the useful circuits. According to one characteristic of an improvement of the invention, the numbers R and N can be modified: the dividers 13 and 14 will be programmable by the microprocessor 15. Consequently, depending on the multiple bands to which it is desired that the mobile telephony telephone of the invention must be matched, it is possible to choose the oscillators 3, 4 and 5 with different frequency ranges, controlled differently, in order to limit the total number of the oscillators.

The mobile telephony telephone of the invention furthermore comprises a reception channel 18. The channel 18 is connected to the antenna 1 by means of a transmission-reception separator device 19 called a duplexer which, alternatively, connects the antenna 1 to the channel 2 or to the channel 18. The channel 18 comprises, like the channel 2, a diplexer 20. It furthermore comprises a low-noise amplifier 21 cascade-connected with the diplexer 20. The reception channel 18 is connected to a first input of a second mixer 22. The mixer 22 is connected by another input to an output of the second oscillator 4. The second oscillator 4 in this case delivers a signal at a transition frequency RFRX, namely a frequency relatively close to the frequency of the signal that goes through the antenna 1. As for the frequency agility, it will be achieved by the programming of the oscillator 4. As will be seen further below, the second oscillator 4 is either assigned to transmission and reception as shown or assigned to one band or to another band. The frequency of the signal received in the channel 18 is thus lowered by mixing in the mixer 22. The resultant signal is injected through a filter 24 into a third mixer 25 by a first input. The third mixer 25 receives, through another input, the signal from the third oscillator 5 by means of a third divider 26. In a preferred example, the third divider 26 is only a divider by two.HERE HERE FIG. 2 shows the same elements as in FIG. 1. However, instead of there being two diplexers and one selection switch 19, there is one diplexer and two selection switches. The elements 7 and 20 are then separate filters.

With the organization just chosen, it can be written that:

FTX is the frequency of the transmitted signal;

FRX is the frequency of the received signal;

FITX is the frequency of the signal of the oscillator 5 in transmission;

FIRX is the frequency of the signal of the oscillator 5 in reception;

RFTX is the frequency of the transition oscillator in transmission;

RFRX is the frequency of the transition oscillator in reception;

fm is the oscillator of the signal at output of the mixer 8;

fc is the comparison oscillator resulting from the divisions by N and R.

In this case:

fc=fm/N and fc=FITX/R

RFTX=N×fc+/−FTX

FTX+/−RFTX=fm.

The technology of the dividers and mixers may be a standard one. For the dividers, given that the signals are frequency modulated and that they are at constant amplitude, it is sufficient to make them go through a set of D type flip-flop circuits to divide the frequency by two, three, four etc. To restore a sine signal, it is then enough to carry out a filtering by means of wideband lowpass filter in order to retrieve exploitable signals. In practice, at output of the dividers 13 and 14, there will not even be a filter of this kind. Only the comparator 10 can have a low frequency lowpass filter, for example between 10 and 100 KHz, before driving the oscillator 3.

With regard to the mixers, these are generally of the unbalanced type. Preferably, the most favored signal of these two signals is exploited. For this reason, the terms 'infradyne mixer' and 'supradyne mixer' are used. To go from one to the other, it is enough to reverse the inputs. In one example, the mixer 22 will be an 'infradyne mixer'. It gives a mixer signal whose frequency is lower than that of any one of the mixer signals.

In one variant, the demodulated baseband signal is not directly available at the output of the third mixer 25. In this case, it is possible to use a fourth mixer 27 that is cascade-connected after a filter 28, with the third mixer 25. The fourth mixer 27 receives, at another input, the signal produced by the oscillator 5 at an intermediate frequency, divided by a fourth divider 29. In a preferred example, the coefficient of division of the fourth divider 29 is equal to 12.

The mixers 25 and 27 are in-quadrature mixers just as the modulator 12 is an in-quadrature modulator. Therefore, as the case may be, they produce I and Q signals in reception (IRX and QRX). These signals are then processed in the mobile telephony telephone by circuits that are not shown. These circuits which are not shown are furthermore those that produced the signals ITX and QTX usable for transmission.

In a simple variant, there will be only one oscillator 3 since there will be only one mixer 22 to perform the transmission and reception in both bands. In a preferred case however the first oscillator 3 will be connected in parallel to a fourth oscillator 30 between the comparator 10 and the diplexer 7. The fourth oscillator 30 will be tuned to a range of frequency other than that of the first oscillator 3. The fourth oscillator 30 itself will also be connected to a power amplifier 31 whose output is connected to one of the two inputs of the diplexer 7. If necessary, a sensor 32 picks up the signal from the oscillator 30 to apply it also to a first input of the mixer 8. In the reception channel, the diplexer 20 has a second output enabling the signals received to be applied to a fifth mixer 33 which is a supradyne mixer parallel-connected with the second mixer 22 in the reception channel 18. In this case, the parallel channel will also comprise a low-noise amplifier 34. Filters are furthermore interposed in each of the channels parallel to the receiver channel 18.

An explanation shall now be given of the way in which the frequency values chosen for the oscillator 4 at frequency transition and for the oscillator 5 at intermediate frequency are obtained. Firstly, we shall first use names of variables to designate the values of frequencies appearing at the different nodes of the circuit. Secondly, we shall establish the inequalities resulting from the above-mentioned constraints of limited range of a single transition frequency oscillator, the non-switching of this oscillator and the supradyne-infradyne combination. Thirdly, we shall show how to resolve the system of inequalities written.

Let us take for the variables:

IFRX, the frequency of the available signal at output of the mixer 22,

FGR, the frequency of the radioelectrical signal received in GSM,

FDR, the frequency of the radioelectrical signal received in DCS,

FGT, the frequency of the radioelectrical signal sent in GSM,

FDT, the frequency of the radioelectrical signal sent in DCS,

OLGR=W the frequency of the transition frequency oscillator in reception in GSM, OLDR=Y the frequency of the transition frequency oscillator in reception in DCS, OLGT=X the frequency of the transition frequency oscillator in transmission in GSM, OLDT=Z the frequency of the transition frequency oscillator in transmission in DCS, REFRX=A the frequency of the intermediate frequency oscillator in reception, REFGT=B the frequency of the intermediate frequency oscillator in transmission in GSM, REFDT=C the frequency of the intermediate frequency oscillator in transmission in DCS.

These signals are furthermore indicated in FIGS. 1 and 2 on the connections at which they are available.

In reception, it is possible to write the following equations:

| in GSM | IFRX = REFRX/2 = OLGR − FGR |
| in DCS | IFRX = REFRX/2 = −OLDR + FDR |

The division by 2 is due to the presence of the divider 26. The reversal of the signs is due to the supradyne-infradyne operation.

In transmission it is possible to write the following two equations:

| in GSM | FGT = OLGT − (N/R) REFGT |
| in DCS | FDT = OLDT + (N'/R') REFDT |

In the invention, indeed, in the above two cases, the sign reversal is due to the supradyne and infradyne character of the mixtures. What is noteworthy in the invention then is that a reversal of this kind is also practised, in transmission, to go from the GSM band to the DCS band or PCS band or other.

From these equations, we get the following frequencies of the transition frequency oscillator:

| OLGR = FDR + REFRX/2 | OLDR = FDR − REFRX/2 |
| OLGT = FGT + (N/R) REFGT | OLDT = FDT − (N'R') REFDT |

With the variables A, B, C, W, X, Y and Z, and choosing a=N/R and b=N'/R', we get, for the midpoints of the standardized bands in GSM and DCS mode, the following equations:

| eq-I, | |
| --- | --- |
| W = A/2 + 942.5 | Y = 1842.5 − A/2 |
| X = aB + 897.5 | Z = 1747.5 − bC |

Depending on the category of the oscillator described here above, the most useful solution according to the invention leads, for a two-band transmitter-receiver, to a single first category oscillator (the least expensive oscillator) for the oscillator 5. And it is necessary to have an adjusted oscillator of the second category for the oscillator 4. Indeed, this adjusted oscillator must cover, according to the equations eq-I,

| in GSM | W ( 17.5 MHz in reception | X ( 17.5 MHz in transmission |
| in DCS | Y ( 37.5 MHz in reception | Z ( 37.5 MHz in transmission |

The constraint of a setting range below 100 MHz for the oscillator 4 is achieved by choosing, as the midpoint of the setting range in transmission, Z, a frequency having a sufficiently small difference with the midpoint of the setting range in reception Y. This difference should then be such that the sum of this difference plus 37.5 MHz towards the low values and 37.5 MHz towards the high values is smaller than 100 MHz. FIG. 3 gives a view, where Y is greater than Z, of the way in which this constraint is expressed. In this case, the range 40, in transmission, centered on Z is offset by |Y−Z| from the range 41 in reception centered on Y. The total of the two ranges, in overlapping, should not exceed the chosen limit (100 MHz in the case shown): this is written as follows:

$$|Z-Y|<100-2\times 37.5=25 \text{ MHz}$$

Similarly, the following will be obtained in GSM:

$$|W-X|<100-2\times 17.5=65 \text{ MHz}$$

If a combination between GSM and DCS is sought, this will lead to:

$$|Z-X|<100-17.5-37.5=45 \text{ MHz and similarly}$$

$$|Z-W|<45 \text{ MHz}$$
$$|Y-X|<45 \text{ MHz}$$
$$|Y-W|<45 \text{ MHz}$$

The constraint on the intermediate frequency oscillator leads with the same reasoning to:

$$|A-B|<30 \text{ Mhz}$$
$$|B-C|<30 \text{ Mhz}$$
$$|C-A|<30 \text{ Mhz}$$

We thus obtain nine double inequalities, eq-II that can be resolved in A, B, C in taking account of the equations eq-I. The inequalities eq-II are furthermore simplified in a form eq-III:

| eq-II | eq-III | |
| --- | --- | --- |
| −25 < Y − Z = −95 − A/2 + bC < 25 | −120 < bC − A/2 < −70 | (1 |
| −65 < X − W = −45 − A/2 + aB < 65 | 20 < aB − A/2 < 110 | (2 |
| −45 < Z − W = 805 − A/2 − bC < 45 | 760 < bC + A/2 < 850 | (3 |
| −45 < Z − X = 850 − aB − bC < 45 | 805 < a/B +bC < 895 | (4 |
| −45 < Y − W = 900 − A/2 − A/2 < 45 | 855 < A < 945 | (5 |
| −45 < Y − X = 945 − A/2 + aB < 45 | 900 < A/2 + aB < 990 | (6 |
| −30 < A − B < 30 | −30 < A − B < 30 | (7 |
| −30 < B − C < 30 | −30 < B − C < 30 | (8 |
| −30 < C − A < 30 | −30 < C − A < 30 | (9 |

The first line (1 expresses for example that Y−Z, which must range from −25 to +25, results from the theoretical deviation 95 between the midpoints of the transmission and reception bands, compensated by the mixture with A/2 and bC.

If we add up the two inequalities (1 and (3:

$-120 < bC - A/2 < -70$ $760 < A/2 + bC < 850$, we get $640 < 2bC < 780$ that is $320 < bC < 390$ to be combined with the addition of (1 with the inverse of (3, namely $70 + bC < A/2 < 120 + bC$ If we add up the two inequalities (2 and (6:

$20 < aB - A/2 < 110$ $900 < A/2 + aB < 990$, we get $920 < 2aB < 1100$ that is $460 < aB < 550$ to be combined with the addition of (2 with the inverse of (6, that is $900 - A/2 < aB < 990 - A/2$;

Furthermore, the inequality 4 leads to:

$805 - bC < aB < 895 - bC$.

The inequalities to be processed then become:

| | |
|---|---|
| $320 < bC < 390$ | (1 |
| $70 + bC < A/2 < 120 + bC$ | (2 |
| $460 < aB < 550$ | (3 |
| $900 - A/2 < aB < 990 - A/2$ | (4 |
| $805 - bC < aB < 895 - bC$ | (5 |
| $855 < A < 945$ | (6 |
| $-30 < C - A < 30$ | (7 |
| $-30 < B - A < 30$ | (8 |
| $-30 < C - B < 30$ | (9 |

If $855 < A < 945$ and $|B-A|$ and $|C-A| < 30$, then A and B must range from 825 to 975 MHz. This limits the values of a and b. If we take N, N', R and R' as being smaller than 8, the condition (1 leads to $920/975 < b < 390/825$, giving $b = 1/3, 3/8, 2/5, 3/7$. If we do the same with the condition 3, then a is limited to $460/975 < a < 550/825$, giving $a = 1/2, 4/7, 3/5, 5/8, 2/3$. The following table referenced TABLE 2 then gives the solutions of the different inequalities for the values of a and b found.

From this we deduce several groups of values giving simple, low-cost solutions to make a two-band telephone.

For three-band operation, the simplest solution according to the invention comprises a simple first category oscillator for the oscillator 5 and a third category oscillator for the transition frequency oscillator. Indeed, given the configuration of reception, the DCS and PCS bandwidths and their divergence, the total DCS PCS band in reception is contained in $1990 - 1805 = 185$ MHz. Let us take a band greater than that of a second category oscillator.

Thus, the approach according to the invention lies in containing the frequency variation in a 220 MHz band for the three bands both in reception and in transmission. In this case, the frequency variation of the transition frequency oscillator will be contained on all the PCS channels to a maximum of 100 MHz.

The inequalities are then written as here above eq-II and eq-III in taking U and V as midpoints of the reception and transmission bands of the oscillator 4 when it is in the PCS range. We obtain $U = 196 - A/2$ and $V = 1880 - cD$. With D as a frequency value of the intermediate frequency oscillator in transmission and c as the ratio N"/R" of the divider coefficients chosen for this PCS range.

The constraint of a band lower than 100 MHz leads to:

$|U-V| < 100 - 2 \times 30 = 40$

The constraint of a 220 Mhz band, in relation to the GSM band, leads to:

$|U-W| < 220 - 17.5 - 30 = 172.5$. And, similarly $|U-X| < 172.5$ $|V-X| < 172.5$ $|V-W| < 172.5$ The constraint of a 220 Mhz band, in relation to a DCS band, leads to:

$|U-Z| < 220 - 37.5 \cdot 30 = 152.5$, and similarly $|U-Y| < 152.5$ $|V-Z| < 152.5$ $|V-Y| < 152.5$ The constraint of a band of the intermediate frequency oscillator which is always smaller than or equal to 30 MHz leads to $|D-A| < 30$, $|D-B| < 30$, and to $|D-C| < 30$.

The constraints on U-Y and U-W relating to the differences in reception may be overlooked. Indeed:

U-Y = (1960 (A/2) - (1842.5 - A/2) = 117.5 MHz, giving U = Y + 117.5 hence necessarily lower than 152.5 MHz. Similarly U-W = (1960 - A/2) - (A/2 + 942.5) = 1017.5 - A. Now $|U-W| < 17$ implies that $-172.5 < 1017.5 - A < 172.5$. That is: $845 < A < 1190$. Since the constraint on A is already $855 < A < 945$, this new constraint brings nothing further. Similarly for $|U-X| < 172.5$ which implies that $-172.5 < 1062.5 - A/2 - aB < 172.5$ equivalent to:

$890 < A/2 + aB < 1235$ brings nothing more than the inequality eq-III-6 that is $900 < A/2 + aB < 990$.

Just as, finally, $|U-Z| < 152.5$ implies that $-152.5 < 212.5 A/2 + bC < 152.5$ equivalent to $365 < bC - A/2 < -60$ brings nothing more than the inequality eq-III-1 that is $-120 < bC - A/2 < -70$.

The inequalities eq-III can be written as

| | | |
|---|---|---|
| $|U-V| < 40$ | that is | $-40 < 80 - A/2 + cD < 40$ |
| $|V-X| < 172.5$ | that is | $-172.5 < 982.5 - cD - aB < 172.5$ |
| $|V-W| < 172.5$ | that is | $-172.5 < 937.5 - cD - A/2 < 172.5$ |
| $|V-Z| < 12.5$ | that is | $-152.5 < 132.5 - cD + bC < 152.5$ |
| $|V-Y| < 152.5$ | that is | $-152.5 < 37.5 - cD + A/2 < 152.5$ |

These five inequalities are respectively equivalent to:

$-120 < cD - A/2 < -40$ $810 < cD + aB < 1155$ $765 < cD + A/2 < 1110$ $20 < dD - bC < 285$ $-115 < cD - A/2 < 190$

They get combined with $-30 < |D-A| < 30$, $-30 < D - B < 30$, and $-30 < |D-C| < 30$. These inequalities lead to:

| eq-IV | |
|---|---|
| $-115 < cD - A/2 < -40$ | (1 |
| $810 < cD + aB < 1155$ | (2 |
| $765 < cD + A/2 < 1110$ | (3 |
| $-20 < cD - bC < 285$ | (4 |
| $-30 < D - A < 30$ | (5 |

-continued eq-IV

| | |
|---|---|
| $-30 < D - B < 30$ | (6 |
| $-30 < D - C < 30$ | (7 |

From the comparison of the inequalities eq-III and eq-IV, it can be observed that if $bC+5<cD<bC+30$, the equations IV-1 to IV-4 are verified.

From the inequalities eq-IV-1 and eq-IV-3 we can derive
$325<cD<650$ and
$-115+A/2<cD<-40+A/2$
The table TABLE 2 is deduced therefrom
The necessary conditions are written as follows eq-V

| | |
|---|---|
| $325 < cD < 650$ | (1 |
| $-115 + A/2_{min} < cD < -40 + A/2_{max}$ | (2 |
| $810 - aB_{min} < cD < 1155 - aB_{max}$ | (3 |
| $bC_{min}\ 20 < cD < 285 + bC_{max}$ | (4 |
| $-30 < D - A < 30$ | (5 |
| $-30 < D - B < 30$ | (6 |
| $-30 < D - C < 30$ | (7 |

By replacing, in the inequalities eq-V-1 to eq-V-4 the min and max values of A/2, bC, aB, we get

| | | |
|---|---|---|
| $-325 < cD < 650$ | | |
| $422.5 < A/2 < 472.5$ | and eq-V-2 gives | $307.5 < cD < 432.5$ |
| $460 < aB < 550$ | and eq-V-3 gives | $260 < cD < 695$ |
| $320 < bC < 350$ | and eq-V-4 gives | $300 < cD < 675$ |

In all, there remain $325<cD<432.5$ and $825<D<675$. This leads for c to the conditions $225/975<c<432.5/825$, that is $1/3<c<0.44$. If N' and R' are limited by 8, it is possible to take the same values as b, namely $1/3$, $3/8$, $2/5$, $3/7$.

An explanation shall be now be given, by means of TABLE 1, of the working of the mobile telephony telephone of the invention. This TABLE 1 has several columns. It also has groupings of information separated by blank lines. Certain groupings represent a solution for setting up the diagram of FIGS. 1 and 2. In each grouping, there are thus either GSM and DCS or GSM, DCS and PCS. A first column gives a brief indication given of the types of frequency band concerned. A second column shows the frequencies of the signals delivered for the reception by the oscillator 4. A third column shows the frequencies of the signals delivered for transmission by the oscillator 4. A fourth column gives information on the divergence Δ of setting between the initial value of the dynamic range of tolerance in transmission and the initial value of the dynamic range of frequency in reception according to a given mode.

A fifth column provides information, for a two-band use, of the maximum exploration of the single oscillator 4. Depending on its value, which is smaller than 40 MHz, 100 MHz or 220 MHz, the type of oscillator to be chosen is deduced therefrom. A sixth column shows the same elements for a three-band assembly. A seventh column contains comments specifying the categories of the oscillators thus chosen.

An eighth column provides information on the reception frequency of the third intermediate frequency oscillator 5 when it is used in reception. A ninth column and tenth column provide information on the values of the coefficients of division N and R chosen. An eleventh column indicates the frequencies of the intermediate frequency oscillator 5 when it is used in transmission.

A twelfth column indicates the frequency leap of the intermediate frequency oscillator when it is used in transmission or reception. It is observed that this frequency leap dictates the category of oscillator to be chosen.

A thirteenth column indicates the use of an infradyne mixer 22 or supradyne mixer 33 by a plus or minus sign. The fourteenth column indicates the value of the first intermediate frequency filter 24. The fifteenth column provides information on the comparison frequency fc implemented in the comparator 10. At the bottom of the TABLE 1, we have recalled the standardized ranges of the GSM, DCS and PCS bands in transmission and reception as well as the normal divergence between the transmission and reception ranges.

For the first grouping represented, these are GSM and DCS standards only. One of the two oscillators (for example the oscillator 4) will serve for the GSM range (but in transmission and reception) while another (an oscillator 23 in parallel with the oscillator 4) will serve for the DCS range (in transmission and reception too). It can be seen that the difference for the oscillators 23 and 4 between the transmission and reception ranges is only 9 MHz or 4 MHz. Indeed, the dynamic range of reception goes from 1195 to 1230 whereas in transmission it goes from 1204 to 1239. In practice, the total dynamic range of the oscillator concerned will be 44 (35 plus 9) whereas it was 80 in the prior art. Consequently, the setting could be more precise. For this first grouping, the oscillator 5 delivers a signal at 540 MHz. In this case, for the GSM band, we have chosen the value 3 for N and the value 5 for R. This leads the comparator 10 in transmission to receive a signal from the oscillator 5 at a frequency 540 MHz/5 equal to 108 MHz.

In transmission, the oscillator 30 used will have a frequency of 880 Mhz at the beginning of the range. The mixer 8 then receives a signal at 880 MHz on its first input. The signal delivered by the oscillator 4 is then at 1204 MHz. The difference 1204 MHz minus 880 MHz results in a signal at 324 MHz. By dividing the frequency of this signal by the coefficient N equal to 3, we then obtain also 108 MHz.

In reception, the mixer 33 will receive a signal at 1195 MHz coming from the oscillator 4. It will furthermore receive a signal at 925 MHz from the antenna 1. The difference of 270 MHz delivered by the mixer 33 will be filtered in the filter 24 which precisely has a value of 270 MHz.

It is possible to redo the same computations for this grouping with the values indicated for the DCS range. In transmission, 1710 MHz minus 1531 MHz equals 179 Mhz. When this value is divided by two for the coefficient N of the divider 14, a comparison frequency of 89.5 Mhz is obtained. This comparison frequency is the same as the one obtained by dividing the frequency of the intermediate frequency oscillator 5 at 537 MHz by 6.

These considerations call for several observations. First of all, a little differently from what has just been stated, a pair of transition oscillators 36, each however with a lower dynamic range, will serve as an oscillator 4 (or oscillator 23) to give the transition frequency signal in transmission and reception. In this case, this pair 36 of these oscillators will also receive a control signal coming from the microprocessor 15 to carry out the appropriate steps of starting operation. In this approach, the oscillator 4 must have a dynamic range of 39 MHz. By comparison, for the DCS range, a single oscillator 23 will be used but will have a dynamic range of 79 MHz instead of having a dynamic range of 170 MHz as in the prior art. Furthermore, the oscillator 5 does not have one and the same intermediate frequency value depending on whether it works in transmission or in reception. However, in the DCS case, it is observed that, since the difference between 540 MHz and 537 MHz is very small, firstly we are sure of being positioned with the circuit 11 in the setting range of this oscillator 5 and secondly the new value will be reached very quickly. At the time of the switch-over, during the passage from transmission to reception or vice versa, the circuit 11 will therefore obtain a change in the value of the oscillator and switch over the functions of the oscillators 4 and 23. More precisely, the output of one oscillator will be applied to a mixer 8 or to the mixer 33. In this case, the other oscillator is neutralized. In another range, it is the other oscillator that will be used.

It is observed, in this case, that five oscillators are used, namely the oscillators 3, 4, 5, 23 and 30. Therefore it is not six of them that are used as might have been expected given the major difference between the GSM range and the DCS range. In the other groupings, there will be only four oscillators, the oscillators 3, 4, 5 and 30.

Furthermore, a particular feature will be noted in the comparison frequency which, in both cases, at 108 MHz or at 89.5 MHz, will never be an integer sub-multiple of a frequency usable in the transmission channel 2. Indeed, 8 times 108 MHz equals 865 MHz (lower than 880 MHz) whereas 9 times 108 MHz equals 972 MHz (higher than 960 MHz). In the same way, 20 times 89.5 MHz equals 1790 MHz, higher than 1785 MHz while 19 times 89.5 MHz equals 1700.5 MHz which is lower than 1710 MHz. This being the case, it would have been possible to find other numbers in this solution for N and R than 3 and 5 in one case and 2 and 6 in the other, but the operation would have been poorer even if it could have been envisaged. Ultimately, what is important in this respect is that no harmonics at the frequency of the comparison signal fc should fall into the transmission band.

For the second grouping, the solution is noteworthy in that the oscillator 4 does not switch between transmission and reception either in GSM or in DCS. The value is the one recalled the above of a faster switching from one reception frame to another. In this second grouping furthermore, if it is sought to obtain a two-band transmitter-receiver, only one second category oscillator will be sufficient. If it is sought to make a three-band transmitter-receiver, either it will be possible to obtain it with two second category oscillators (one with one dynamic range of 85 MHz and the other with a dynamic range of 67 MHz) or it will be possible to obtain it with a single third category oscillator (with a dynamic range of 202 MHz).

By contrast, the third grouping shows an exemplary embodiment not in accordance with the invention, that was practiced in the prior art. In this grouping, whereas it was already necessary, for the GSM range, to have a second category oscillator available, for the DCS range it is necessary in addition to have a third-category oscillator. Furthermore it is necessary also to have an additional third category oscillator for the PCS range with no hope whatsoever that an oscillator used in one range might serve in another.

The last four groupings shown in the TABLE 1 have a particular feature wherein, if they are three-band groupings, they need a third-category oscillator. They need a second-category oscillator if they are two-band groupings. Or else, for three bands, two second-category oscillators may be used. For example, for the fourth grouping, the dynamic range of the oscillator 4, used in transmission or in two-band reception as needed, will be 1365 MHz to 1445 MHz. It is barely higher, with 80 MHz in all, than the dynamic range of 75 MHz of only one of the transmission or reception bands in the DCS range. Hence, with the choices resulting from the TABLE 1, not only is the dynamic range reduced with respect to what would have been necessary for a single range (the DCS range) but furthermore, the same oscillator 4 is used here for both the GSM and the DCS ranges or even all three ranges. In the case of these last four groupings as in the case of the first two groupings, neither the fourth mixer 27 nor the filter 28 nor the divider 29 is used. This would nevertheless be possible with other frequency values.

With the two transmission frequency oscillators 3 and 30 that are necessary (because the frequency bands, the GSM band on the one hand and the DCS band on the other, are really too distant) and with the oscillator 5 at the intermediate frequency, this leads to a number of oscillators limited to four. It is thus possible to manage the PCS band in a fairly easy way.

The fourth grouping resembles the fifth grouping. In this fifth grouping however the differences in dynamic range are still very small: it is even easier to control the transition frequency oscillators. By contrast, between transmission and reception, the difference in frequencies of intermediate frequency oscillators must be more accentuated, going form 880 Mhz to 847 MHz. In both cases, the comparison frequencies around 170 MHz and around 121 MHz are external, by their harmonics, to the concerned bands in transmission.

With the invention, firstly it is possible to reduce the number of filters in transmission and secondly the parasites are efficiently removed from the transmission synthesis during the final mixing in the mixer 8. It will also be noted that one and the same oscillator is used in a given mode (GSM, or DCS or PCS) in transmission and in reception. As a consequence, the invention could make it possible to do without any switch-over between transmission and reception in the GSM mode or the DCS mode. The switch-over prevented is that of the oscillator 4.

With the invention, the following results are truly achieved. The number of components, especially of oscillators, is reduced. The switch-over commands are reduced: the standard-changing commands are organized like the one pertaining to the frequency agility. There is a reduced dynamic range of variation in frequency of the oscillators. No harmonic of the signal at the comparison frequency is located in the transmitted band. The filters used are standardized, especially a 440 MHz filter.

Not all the solutions that can be envisaged are shown in the TABLE 1. This table only shows certain preferred approaches. Other approaches deduced from the table TABLE 2 and from the determining method of the invention can also be envisaged.

TABLE 1

| | VCORFRX | VCOFRTX | Δ | 2-BAND | 3-BAND | Comments | VCOFIRX | N | R |
|---|---|---|---|---|---|---|---|---|---|
| GSM | 1195-1230 | 1204-1239 | 9 | 44 | | two of | 540 | 3 | 5 |
| DCS | 1535-1610 | 1531-1606 | 4 | 79 | | category 2 | 540 | 2 | 6 |
| GSM | 1360-1395 | 1360-1395 | 0 | 85 | 202 | only one of | 870 | 4 | 7 |
| DCS | 1370-1445 | 1370-1445 | 0 | 85 | 202 | category | 870 | 2 | 5 |
| PCS | 1495-1555 | 1502-1562 | 0 | 67 | 202 | three/two | 870 | 2 | 5 |
| GSM | 1207-1242 | 1162-1197 | | 80 | | | 564 | 2 | 4 |
| DCS | 1523-1598 | 1569-1644 | | 121 | | | 564 | 1 | 4 |
| PCS | 1648-1708 | 1709-1769 | | 121 | | | | | |
| GSM | 1365-1400 | 1390-1425 | 25 | 80 | 197 | only one of | 880 | 3 | 5 |
| DCS | 1365-1440 | 1370-1445 | 5 | 80 | 197 | category | 880 | 2 | 5 |
| PCS | 1490-1550 | 1502-1562 | 12 | 72 | 197 | three/two | 880 | 2 | 5 |
| GSM | 1365-1400 | 1364-1399 | 1 | 93 | 203 | only one of | 880 | 4 | 7 |
| DCS | 1365-1440 | 1347-1422 | 18 | 93 | 203 | category | 880 | 3 | 7 |
| PCS | 1490-1550 | 1487-1547 | 3 | 67 | 203 | three/two | 880 | 3 | 7 |
| GSM | 1358-1393 | 1387-1422 | 29 | 89 | 204 | only one of | 866 | 3 | 5 |
| DCS | 1372-1447 | 1370-1445 | 2 | 89 | 204 | category | 866 | 2 | 5 |
| PCS | 1497-1557 | 1502-1562 | 5 | 65 | 204 | three/two | 866 | 2 | 5 |
| GSM | 1384-1419 | 1364-1399 | 20 | 76 | 201 | only one of | 918 | 4 | 7 |
| DCS | 1346-1421 | 1347-1422 | 1 | 76 | 201 | category | 918 | 3 | 7 |
| PCS | 1471-1531 | 1487-1547 | 16 | 76 | 201 | three/two | 918 | 3 | 7 |
| GSM | 0925-0960 | 0880-0915 | 45 | 80 | | | | | |
| DCS | 1805-1880 | 1710-1785 | 95 | 170 | | | | | |
| PCS | 1930-1990 | 1850-1910 | 80 | 140 | | | | | |

| | VCOFITX | BDE Fl | +/- | 1st FILTER Fl | F COMPAR |
|---|---|---|---|---|---|
| GSM | 540 | 0 | --- | 270 | 108 |
| DCS | 537 | 3 | ++ | 270 | 89.5 |
| GSM | 840 | 30 | --- | 435 | 120 |
| DCS | 850 | 30 | ++ | 435 | 170 |
| PCS | 870 | 30 | ++ | 435 | 174 |
| GSM | 564 | | | | |
| DCS | 564 | | | | |
| PCS | | | | | |
| GSM | 850 | 30 | --- | 440 | 170 |
| DCS | 850 | 30 | ++ | 440 | 170 |
| PCS | 870 | 30 | ++ | 440 | 174 |
| GSM | 847 | 33 | --- | 440 | 121 |
| DCS | 847 | 33 | ++ | 440 | 121 |
| PCS | 847 | 33 | ++ | 440 | 121 |
| GSM | 850 | 20 | --- | 433 | 170 |
| DCS | 850 | 20 | ++ | 433 | 170 |
| PCS | 870 | 20 | ++ | 433 | 174 |
| | | | | close to 440 and available | |
| GSM | 847 | 71 | --- | 459 | 121 |
| DCS | 847 | 71 | ++ | 459 | 121 |
| PCS | 847 | 71 | ++ | 459 | 121 |
| GSM | | | | | |
| DCS | | | | | |
| PCS | | | | | |

TABLE 2

| | b | | | 0.33 | 0.38 | 0.40 | 0.43 |
|---|---|---|---|---|---|---|---|
| condition 1 | 320 < bC < 390 | min | | 320.00 | 320.00 | 320.00 | 320.00 |
| | | max | | 390.00 | 390.00 | 390.00 | 390.00 |
| condition 6 and 7 | 825 < C < 975 | min | | 960.00 | 853.33 | 825.00 | 825.00 |
| | | max | | 975.00 | 975.00 | 975.00 | 910.00 |
| | bC | bC min | | 320.00 | 320.00 | 330.00 | 353.57 |
| | | bC max | | 325.00 | 365.63 | 390.00 | 390.00 |
| condition 2 | A/2 | 70 + bC min | | 390.00 | 390.00 | 400.00 | 423.57 |
| | | 120 + bC max | | 445.00 | 485.63 | 510.00 | 510.00 |
| + condition 6 | 855 < A < 945 | A min | | 855.00 | 855.00 | 855.00 | 855.00 |
| | | A max | | 890.00 | 945.00 | 945.00 | 945.00 |
| + condition 7 | ABS [C− A] < 30 | A min | | 960.00 | 855.00 | 855.00 | 855.00 |
| | | A max | | 890.00 | 945.00 | 945.00 | 940.00 |
| condition 5 | aB | 805 − bC max | | | 439.38 | 415.00 | 415.00 |
| | | 895 − bC min | | | 575.00 | 565.00 | 541.43 |

TABLE 2-continued

| | | | | | | |
|---|---|---|---|---|---|---|
| + condition 3 | 460 < ab < 550 | min | | 460.00 | 460.00 | 460.00 |
| | | max | | 550.00 | 550.00 | 541.43 |
| + condition 4 | 900 − A/2 < ab < 990 − A/2 | 900 − A/2 max | | 460.00 | 460.00 | 460.00 |
| | | 990 − A/2 min | | 550.00 | 550.00 | 541.43 |
| a = ½ + condition 8 | 0.50 | B min | | 920.00 | 920.00 | 920.00 |
| | | B max | | 975.00 | 975.00 | 970.00 |
| a = 4/7 + condition 8 | 0.57 | B min | | 825.00 | 825.00 | 825.00 |
| | | B max | | 962.50 | 962.50 | 947.50 |
| a = ⅗ + condition 8 | 0.60 | B min | | 825.00 | 825.00 | 825.00 |
| | | B max | | 916.67 | 916.67 | 902.38 |
| a = ⅝ + condition 8 | 0.63 | B min | | 825.00 | 825.00 | 825.00 |
| | | B max | | 880.00 | 880.00 | 866.29 |
| a = ⅔ + condition 8 | 0.67 | B min | | 825.00 | 825.00 | 825.00 |
| | | B max | | 825.00 | 825.00 | 812.14 |
| a = ½ + conditions 7, 8 and 9 | 0.50 | B min | | 920.00 | 920.00 | 920.00 |
| | | B max | | 975.00 | 975.00 | 940.00 |
| | | A min | | 890.00 | 890.00 | 890.00 |
| | | A max | | 945.00 | 945.00 | 940.00 |
| | | C min | | 890.00 | 890.00 | 890.00 |
| | | C max | | 975.00 | 975.00 | 910.00 |
| a = 4/7 + conditions 7, 8 and 9 | 0.57 | B min | | 825.00 | 825.00 | 825.00 |
| | | B max | | 962.50 | 962.50 | 940.00 |
| | | A min | | 855.00 | 855.00 | 855.00 |
| | | A max | | 945.00 | 945.00 | 940.00 |
| | | C min | | 853.33 | 825.00 | 825.00 |
| | | C max | | 975.00 | 975.00 | 910.00 |
| a = ⅗ + conditions 7, 8 and 9 | 0.60 | B min | | 825.00 | 825.00 | 825.00 |
| | | B max | | 916.67 | 916.67 | 902.38 |
| | | A min | | 855.00 | 855.00 | 855.00 |
| | | A max | | 945.00 | 945.00 | 932.38 |
| | | C min | | 853.33 | 825.00 | 825.00 |
| | | C max | | 946.67 | 946.67 | 910.00 |
| a = ⅝ + conditions 7, 8 and 9 | 0.63 | B min | | 825.00 | 825.00 | 825.00 |
| | | B max | | 880.00 | 880.00 | 866.29 |
| | | A min | | 855.00 | 855.00 | 855.00 |
| | | A max | | 910.00 | 910.00 | 896.29 |
| | | C min | | 853.33 | 825.00 | 825.00 |
| | | C max | | 910.00 | 910.00 | 896.29 |
| a = ⅔ + conditions 7, 8 and 9 | 0.67 | B min | | 825.00 | 825.00 | 825.00 |
| | | B max | | 825.00 | 825.00 | 812.14 |
| | | A min | | 855.00 | 855.00 | 855.00 |
| | | A max | | 855.00 | 855.00 | 842.14 |
| | | C min | | 853.33 | 825.00 | 825.00 |
| | | C max | | 855.00 | 855.00 | 842.14 |
| condition | 345 < bC < 365 | min | 345.00 | 345.00 | 345.00 | 345.00 |
| | | max | 365.00 | 365.00 | 365.00 | 365.00 |
| condition 6 and 7 | 825 < C < 975 | min | 1035.00 | 920.00 | 862.50 | 825.00 |
| | | max | 975.00 | 973.33 | 912.50 | 851.67 |
| | bC | bC min | 345.00 | 345.00 | 345.00 | 353.57 |
| | | bC max | 325.00 | 365.00 | 365.00 | 365.00 |
| condition 2 | A/2 | 70 + bC max | 395.00 | 435.00 | 435.00 | 435.00 |
| | | 120 + bC min | 465.00 | 465.00 | 465.00 | 473.57 |
| + condition 6 | 855 < A < 945 | A min | 855.00 | 870.00 | 870.00 | 870.00 |
| | | A max | 930.00 | 930.00 | 930.00 | 945.00 |
| + condition 7 | ABS [C − A] < 30 | A min | 1035.00 | 890.00 | 870.00 | 870.00 |
| | | A max | 930.00 | 930.00 | 930.00 | 881.67 |
| condition 5 | aB | 805 − bC max | | 460.00 | 460.00 | 451.43 |
| | | 895 − bC min | | 530.00 | 530.00 | 530.00 |
| + condition 3 | ab = 505 | min | | 505.00 | 505.00 | 505.00 |
| | | max | | 505.00 | 505.00 | 505.00 |
| + condition 4 | 900 − A/2 < ab < 990 − A/2 | 900 − A/2 max | | 505.00 | 505.00 | 505.00 |
| | | 990 − A/2 min | | 505.00 | 505.00 | 505.00 |
| a = ½ + condition 8 | 0.50 | B min | | 1010.00 | 1010.00 | 1010.00 |
| | | B max | | 960.00 | 960.00 | 911.67 |
| a = 4/7 + condition 8 | 0.57 | B min | | 883.75 | 883.75 | 883.75 |
| | | B max | | 883.75 | 883.75 | 883.75 |
| a = ⅗ + condition 8 | 0.60 | B min | | 860.00 | 841.67 | 841.67 |
| | | B max | | 841.67 | 841.67 | 841.67 |
| a = ⅝ + condition 8 | 0.63 | B min | | 860.00 | 840.00 | 840.00 |
| | | B max | | 808.00 | 808.00 | 808.00 |
| a = ⅔ + condition 8 | 0.67 | B min | | 860.00 | 840.00 | 840.00 |
| | | B max | | 757.50 | 757.50 | 757.50 |
| a = ½ + conditions 7, 8 and 9 | 0.50 | B min | | 1010.00 | 1010.00 | 1010.00 |
| | | B max | | 960.00 | 942.50 | 881.67 |
| | | A min | | 980.00 | 980.00 | 980.00 |
| | | A max | | 930.00 | 930.00 | 881.67 |
| | | C min | | 980.00 | 980.00 | 980.00 |
| | | C max | | 960.00 | 912.50 | 851.67 |

TABLE 2-continued

| | | | | | | |
|---|---|---|---|---|---|---|
| a = 4/7 + conditions 7, 8 and 9 | 0.57 | B min | | 890.00 | 883.75 | 883.75 |
| | | B max | | 883.75 | 883.75 | 881.67 |
| | | A min | | 890.00 | 870.00 | 870.00 |
| | | A max | | 913.75 | 913.75 | 881.67 |
| | | C min | | 920.00 | 862.50 | 853.75 |
| | | C max | | 913.75 | 912.50 | 851.67 |
| a = 3/5 + conditions 7, 8 and 9 | 0.60 | B min | | 890.00 | 841.67 | 841.67 |
| | | B max | | 841.67 | 841.67 | 841.67 |
| | | A min | | 890.00 | 870.00 | 870.00 |
| | | A max | | 871.67 | 871.67 | 871.67 |
| | | C min | | 920.00 | 862.50 | 840.00 |
| | | C max | | 871.67 | 871.67 | 851.67 |
| a = 5/8 + conditions 7, 8 and 9 | 0.63 | B min | | 890.00 | 840.00 | 840.00 |
| | | B max | | 808.00 | 808.00 | 808.00 |
| | | A min | | 890.00 | 870.00 | 870.00 |
| | | A max | | 838.00 | 838.00 | 838.00 |
| | | C min | | 920.00 | 862.50 | 840.00 |
| | | C max | | 838.00 | 838.00 | 838.00 |
| a = 2/3 + conditions 7, 8 and 9 | 0.67 | B min | | 890.00 | 840.00 | 840.00 |
| | | B max | | 757.50 | 757.50 | 757.50 |
| | | A min | | 890.00 | 870.00 | 870.00 |
| | | A max | | 787.50 | 787.50 | 787.50 |
| | | C min | | 920.00 | 862.50 | 840.00 |
| | | C max | | 787.50 | 787.50 | 787.50 |
| A | 870.00 | A/2 | 435.00 | W | 1377.5 | 1360 | 1395 |
| B | 840.00 | | | X | 1377.5 | 1360 | 1395 |
| C | 850.00 | | | Y | 1407.5 | 1370 | 1445 |
| a | 0.57 | aB | 480.00 | Z | 1407.5 | 1370 | 1445 |
| b | 0.40 | bC | 340.00 | | min/max | 1360 | 1445 |
| | | | | | | bande | 85 |

What is claimed is:

1. A method for the setting of a multiband telephony receiver comprising a radiation antenna (1), a transmission channel (2) and a reception channel (18) connected to this aerial, a first (3), second (4) and third (5) voltage-controlled oscillator respectively delivering a signal at a transmission frequency (FTX), a signal at a transition frequency (RFTX, RFRX), and a signal at an intermediate frequency (FITX), the signal at the transmission frequency being transmitted by the first oscillator to the antenna, a first mixer (8) connected at input to the outputs of the first and second oscillators and receiving, from this first oscillator, the signal at the transmission frequency and, from this second oscillator, the signal at the transition frequency, a comparator (10) connected at input to the output of the first mixer and to the output of the third oscillator, and delivering at output a control signal for the first oscillator, and between the first mixer and the comparator and, between the third oscillator and the comparator respectively, a first (14) and a second (13) frequency divider, characterized in that it comprises the following steps:
  a system of inequalities is set up taking account of a frequency-limited dynamic range of a single transition frequency oscillator so that this oscillator covers all the desired bands in transmission and reception, this system of inequalities possessing unknown quantities that are frequency ranges of this transition frequency oscillator and this intermediate frequency oscillator,
  the system of inequalities is resolved by choosing values of division of the frequency dividers below a predetermined number,
  the transmitter-receiver is set with solutions of the inequalities and by programming the dividers,
  and the first mixer is made to work in infradyne mode for one frequency band and in supradyne mode for another.

2. Method according to claim 1, wherein:
  a dynamic range limited to a first threshold is chosen for one oscillator and a dynamic range limited to a second threshold is chosen for another oscillator.

3. Method according to claim 2, wherein:
  the first threshold is equal to 100 MHz and the second threshold is equal to 200 MHz, both to within plus or minus 5%.

4. Method according to claim 1, wherein the predetermined number is equal to 8.

5. Mobile telephone comprising a transmitter-receiver that is set according to claim 1, wherein the transition frequency oscillator is set with values, in MHz, ranging in reception and in transmission respectively,
  in GSM, between 1195 and 1230 and between 1204 and 1239
  in DCS, between 1535 and 1610 and between 1531 and 1606.

6. Telephone according to claim 5, comprising a third mixer (33) parallel-mounted with the second mixer (22) in the reception channel.

7. Telephone according to claim 5, wherein the second and third oscillator are voltage-controlled by a programmable reference circuit (11).

8. Telephone according to claim 5, wherein the third divider (26) is a divider by two.

9. Telephone according to claim 5, wherein the first oscillator (3) is parallel-connected with a fourth oscillator (30) tuned to a frequency band other than that of this first oscillator.

10. Telephone according to claim 5, wherein the second divider comprises several cascade-connected sub-dividers especially a first sub-divider for dividing by 1, 2 or 3 and a second sub-divider.

11. Mobile telephone comprising a transmitter-receiver that is set according to one claim 1, wherein the transition frequency oscillator is set with values, in MHz, ranging, in reception and in transmission respectively, between in GSM, between 1360 and 1395 and between 1360 and 1395 in DCS, between 1370 and 1445 and between 1370 and 1445.

12. Mobile telephone comprising a transmitter-receiver that is set according to claim 1, wherein the transition frequency oscillator is set with values, in MHz, ranging, in reception and in transmission respectively, between in GSM, between 1360 and 1395 and between 1360 and 1395 in DCS, between 1370 and 1445 and between 1370 and 1445 in PCS, between 1495 and 1555 and between 1502 and 1562.

13. Mobile telephone comprising a transmitter-receiver that is set according to claim 1, wherein the transition frequency oscillator is set with values, in MHz, ranging, in reception and in transmission respectively, between in GSM, between 1365 and 1400 and between 1390 and 1425 in DCS, between 1365 and 1440 and between 1370 and 1445 in PCS, between 1490 and 1550 and between 1502 and 1562.

14. Mobile telephone comprising a transmitter-receiver that is set according to claim 1, wherein the transition frequency oscillator is set with values, in MHz, ranging, in reception and in transmission respectively, in GSM, between 1365 and 1400 and between 1364 and 1399 in DCS, between 1365 and 1440 and between 1347 and 1422 in PCS, between 1490 and 1550 and between 1487 and 1547.

15. Mobile telephone comprising a transmitter-receiver that is set according to claim 1, wherein the transition frequency oscillator is set with values, in MHz, ranging, in reception and in transmission respectively, in GSM, between 1358 and 1393 and between 1387 and 1422 in DCS, between 1372 and 1447 and between 1370 and 1445 in PCS, between 1497 and 1557 and between 1502 and 1562.

16. Mobile telephone comprising a transmitter-receiver that is set according to claim 1, wherein the transition frequency oscillator is set with values, in MHz, ranging, in reception and in transmission respectively, between in GSM, between 1384 and 1419 and between 1364 and 1399 in DCS, between 1346 and 1421 and between 1347 and 1422 in PCS, between 1471 and 1531 and between 1487 and 1547.

* * * * *